United States Patent
Chacko et al.

(10) Patent No.: US 11,120,117 B2
(45) Date of Patent: Sep. 14, 2021

(54) SYSTEM AND METHOD FOR DELEGATING ACCESS OF SENSITIVE INFORMATION

(71) Applicant: HCL TECHNOLOGIES LIMITED, Uttar Pradesh (IN)

(72) Inventors: Simy Chacko, Tamil Nadu (IN); Jose Vincent, Tamil Nadu (IN); Ramesh Gurusamy, Tamil Nadu (IN); Vijay Kulandaisamy, Tamil Nadu (IN)

( * ) Notice: Subject to any disclaimer, the term of this patent is extended or adjusted under 35 U.S.C. 154(b) by 290 days.

(21) Appl. No.: 16/292,941

(22) Filed: Mar. 5, 2019

(65) Prior Publication Data

US 2019/0286804 A1  Sep. 19, 2019

(30) Foreign Application Priority Data

Mar. 19, 2018  (IN) .............................. 201811010081

(51) Int. Cl.
*G06F 21/00* (2013.01)
*G06F 21/33* (2013.01)
*H04L 29/06* (2006.01)
*G06F 21/60* (2013.01)
*G06F 21/44* (2013.01)

(52) U.S. Cl.
CPC ............ *G06F 21/335* (2013.01); *G06F 21/44* (2013.01); *G06F 21/606* (2013.01); *H04L 63/0807* (2013.01)

(58) Field of Classification Search
CPC ........ G06F 21/335; G06F 21/45; G06F 21/62; G06F 21/6218; G06F 21/6272; H04L 63/10; H04L 63/105; H04L 63/107; H04L 63/108
See application file for complete search history.

(56) References Cited

U.S. PATENT DOCUMENTS

| | | | |
|---|---|---|---|
| 7,380,280 B2 | 5/2008 | de Jong | |
| 8,955,030 B2 | 2/2015 | Heie et al. | |
| 9,280,613 B2 | 3/2016 | Smith et al. | |
| 9,374,354 B2 | 6/2016 | Shin et al. | |
| 9,418,376 B2 | 8/2016 | Fransdonk | |
| 9,736,140 B1 | 8/2017 | Wu et al. | |
| 2003/0161473 A1* | 8/2003 | Fransdonk | H04L 63/062 380/277 |
| 2003/0182559 A1 | 9/2003 | Curry et al. | |
| 2014/0365781 A1* | 12/2014 | Dmitrienko | G06F 21/34 713/185 |

* cited by examiner

*Primary Examiner* — Edward Zee
(74) *Attorney, Agent, or Firm* — Kendal Sheets

(57) ABSTRACT

Disclosed is a system for delegating access of sensitive information by a user device to a requestor device through a central server. A receiving module receives a first token Identification (ID) generated by the user device in an offline mode and a request, comprising a second token ID, from the requestor device. A validation module validates the request by comparing the first token ID and the second token ID. An identification module identifies a subset of the sensitive information based on a profile of the requestor, when the first token ID is matched with the second token ID. A watermarking module watermarks the subset of the sensitive information with a set of variables to generate watermarked sensitive information. Upon generating the watermarked sensitive information, the access delegation module delegates the access of the watermarked sensitive information to the requestor device.

11 Claims, 3 Drawing Sheets

SYSTEM AND METHOD FOR DELEGATING ACCESS OF SENSITIVE INFORMATION

CROSS-REFERENCE TO RELATED APPLICATIONS AND PRIORITY

The present application claims benefit from Indian Patent Application 201811010081 filed on Mar. 19, 2018 the entirely of which is hereby incorporated by reference.

TECHNICAL FIELD

The present subject matter described herein, in general, relates to sharing of sensitive information and more particularly to delegating access of sensitive information by a user device to a requestor device through a central server.

BACKGROUND

In today's world, due to advancement of Internet technologies, every data is being saved in an electronic form and is uploaded over cloud. The Internet facilitates sharing of data between one or more parties. As the data is being shared over the Internet, it has become one of the paramount concerns to secure the data. Apart from the security of the data, it has been observed that sensitive information including, but not limited to, personal identity card, passport, medical history report, social security number, income proof, and address proof may also be compromised if robust security measures are not adapted. Further, as the sensitive information is uploaded over the cloud, any security breach/hacking activity may compromise the sensitive information. In addition, it has been observed that users' sensitive information is being accessed by unknown parties with no knowledge to the user. Thus, there is a constant threat of data leak and privacy of the users' sensitive information.

SUMMARY

Before the present systems and methods for delegating access of sensitive information by a user device to a requestor device through a central server, are described, it is to be understood that this application is not limited to particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for delegating access of sensitive information by a user device to a requestor device through a central server and the concepts are further described below in the detailed description. This summary is not intended to identify essential features of the claimed subject matter nor is it intended for use in determining or limiting the scope of the claimed subject matter.

In one implementation, a method for delegating access of sensitive information by a user device to a requestor device through a central server is disclosed. In order to delegate the access, initially, a first token Identification (ID) generated by a user device in an offline mode may be received. In one aspect. the first token ID may be generated to delegate the access of sensitive information of the user to a requestor device. In another aspect, the sensitive information of the user may be pre-stored at the central server. Subsequently, a request may be received from the requestor device. In one embodiment, the request may comprise a second token ID. Upon receiving the request, the request may be validated by comparing the first token ID and the second token ID. It is to be noted that the first token ID is received from the user device and the second token ID is received from the requestor device. Post validation, a subset of the sensitive information may be identified based on a profile of the requestor. It is to be noted that the subset of the sensitive information may be identified when the first token ID is matched with the second token ID. After identifying the subset of the sensitive information, the subset of the sensitive information may be watermarked with a set of variables to generate watermarked sensitive information. Upon generating the watermarked sensitive information, the access of the watermarked sensitive information may be delegated to the requestor device. In another aspect, the aforementioned method for delegating access of sensitive information by a user device to a requestor device through a central server may be performed by a processor using programmed instructions stored in a memory.

In another implementation, a system for delegating access of sensitive information by a user device to a requestor device through a central server is disclosed. The system may comprise a processor and a memory coupled to the processor. The processor may execute a plurality of modules present in the memory. The plurality of modules may comprise a receiving module, a validation module, an identification module, a watermarking module, and an access delegation module. The receiving module may receive a first token Identification (ID) generated by a user device in an offline mode. In one aspect, the first token ID may be generated to delegate the access of sensitive information of the user to a requestor device. In another aspect, the sensitive information of the user may be pre-stored at the central server. Further, the receiving module may receive a request from the requestor device. In one embodiment, the request may comprise a second token ID. Further to receiving the first token ID and the request, the validation module may validate the request by comparing the first token ID and the second token ID. It is to be noted that the first token ID is received from the user device and the second token ID is received from the requestor device. Post validation, the identification module may identify a subset of the sensitive information based on a profile of the requestor. It is to be noted that the subset of the sensitive information may be identified when the first token ID is matched with the second token ID. After identifying the subset of the sensitive information, the watermarking module may watermark the subset of the sensitive information with a set of variables to generate watermarked sensitive information. Upon generating the watermarked sensitive information, the access delegation module may delegate the access of the watermarked sensitive information to the requestor device.

In yet another implementation, non-transitory computer readable medium embodying a program executable in a computing device for delegating access of sensitive information by a user device to a requestor device through a central server is disclosed. The program may comprise a program code for receiving a first token Identification (ID) generated by a user device in an offline mode. In one aspect, the first token ID is generated to delegate an access of sensitive information of a user to a requestor device. In another aspect, the sensitive information of the user may be pre-stored at the central server. The program may further comprise a program code for receiving a request, comprising a second token ID, from the requestor device. The program may further comprise a program code for validating the request by comparing the first token ID and the second token ID. It is to be noted that the first token ID is received from the user device and the second token ID is received from the requestor device. The program may further comprise a program code for identifying a subset of the sensitive information based on a profile of the requestor, when the first token ID is matched with the second token ID. The program may further comprise a program code for watermarking the subset of the sensitive information with a set of variables to generate watermarked sensitive information. The program may further comprise a program code for delegating the access of the watermarked sensitive information to the requestor device.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
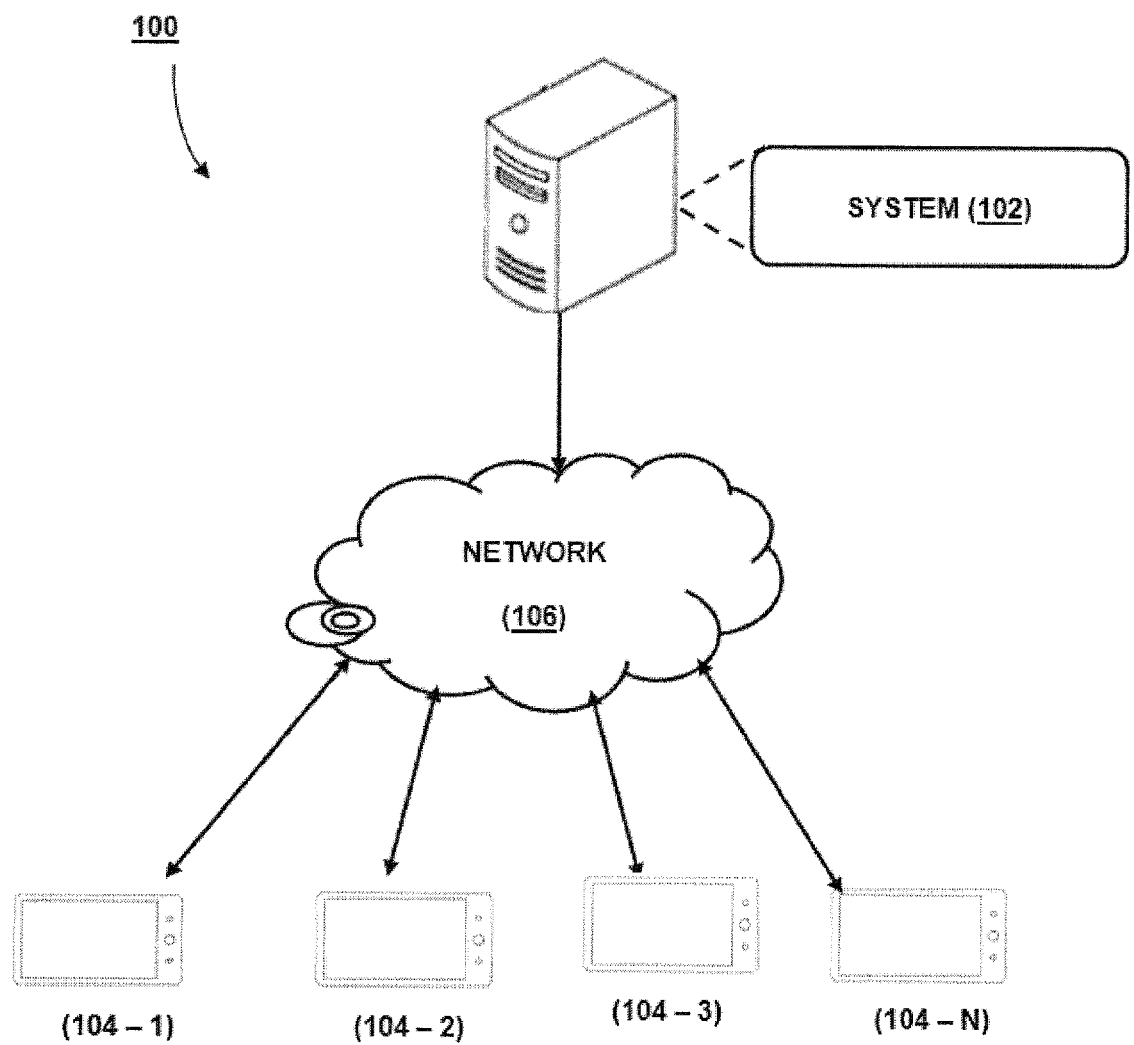
FIG. 1 illustrates a network implementation of a system for delegating access of sensitive information by a user device to a requestor device through a central server, in accordance with an embodiment of the present subject matter.

Some embodiments of this disclosure, illustrating all its features, will now be discussed in detail. The words "receiving," "validating," "watermarking," "identifying" and "delegating," and other forms thereof. are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for delegating access of sensitive information by a user device to a requestor device through a central server are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention identities system and a method for delegating access of sensitive information by a user device to a requestor device through a central server. It is to be noted that the sensitive information of the user is pre-stored at the central server. The method facilitates generation of a token Identification (ID) for delegating the access to the requestor device. The token ID is generated by a user device in an offline mode by using a user's identity, a requestor's identity, and a requestor's device id. In one example, the token ID may be generated by using a plurality of parameters including, but not limited to, a device id, session id, location of a user, location of a requestor, time, profile of the requestor and nature of the personal information. Upon generation of the token ID, the user may share the token ID with the requestor by using at least one of a QR code, an email, a Bluetooth and other. It is to be noted that the user may send an encoded token ID to the requestor thereby providing security to data transmission. The encoding of the token ID may be based on a private key associated with the user. Upon receiving the encoded token ID, the requestor may decode the encoded token 1D by using a public key of the requestor in an offline mode.

Once the token ID is received by the requestor device, the requestor device may transmit the token ID to the central server for validation. Once the token ID is validated, the central server may identify a subset of the sensitive information to be shared with the requestor. Subsequently, the subset of the sensitive information may be watermarked with a set of variables to generate watermarked sensitive information. Example of the set of variables may comprise at least one of a time stamp, a session id, and Global Positioning System (GPS) coordinates of the requestor device. Upon generating the watermarked sensitive information, the access of the watermarked sensitive information may be delegated to the requestor device. It is to be noted that the watermarked sensitive information is only for viewing. In one example, the watermarked sensitive information may be displayed in an image form on the requestor device. In one embodiment, the watermarked sensitive information may be delegated for a stipulated time interval to the requestor device. Thus, upon expiry of the stipulated time interval, the watermarked sensitive information may be erased from the requestor device.

In another embodiment, the requestor may further delegate the access to the third party. In order to do so, a new token ID may be generated by the requestor device with a third party's identity and third party's device id. Once the new token ID is validated by the central server, the third party may access the watermarked sensitive information for a stipulated time interval on a third party device. It is to be noted that in order to share the watermarked sensitive information with the third party an additional watermarking may either be included or removed from the watermarked sensitive information. Further, it is to be noted that the watermarked sensitive information gets erased from the third party device upon expiry of the stipulated time interval.

Referring now to FIG. 1, a network implementation 100 of a system 102 for delegating access of sensitive information by a user device to a requestor device through a central server is disclosed. In order to delegating access of the sensitive information, initially, the system 102 may receive a first token Identification (ID) generated by a user device in an offline mode. In one aspect, the first token ID may be generated to delegate the access of sensitive information of the user to a requestor device. In another aspect, the sensitive information of the user may be pre-stored at the central server. Further, the system 102 may receive a request from the requestor device. In one embodiment, the request may comprise a second token ID. Further to receiving the first token ID and the request, the system 102 may validate the request by comparing the first token ID and the second token ID. It is to be noted that the first token ID may be received from the user device and the second token ID may be received from the requestor device. Post validation, the system 102 may identify a subset of the sensitive information based on a profile of the requestor. It is to be noted that the subset of the sensitive information may be identified when the first token ID is matched with the second token ID. After identifying the subset of the sensitive information, the system 102 may watermark the subset of the sensitive information with a set of variables to generate watermarked sensitive information. Upon generating the watermarked sensitive information, the system 102 may delegate the access of the watermarked sensitive information to the requestor device Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the user device 104 may also comprise a requestor device 104. In one implementation, the system 102 may comprise the cloud-based computing environment in which a user may operate individual computing systems configured to execute remotely located applications. Examples of the user devices 104 may include, but are not limited to, a portable computer, a personal digital assistant, and a handheld device. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
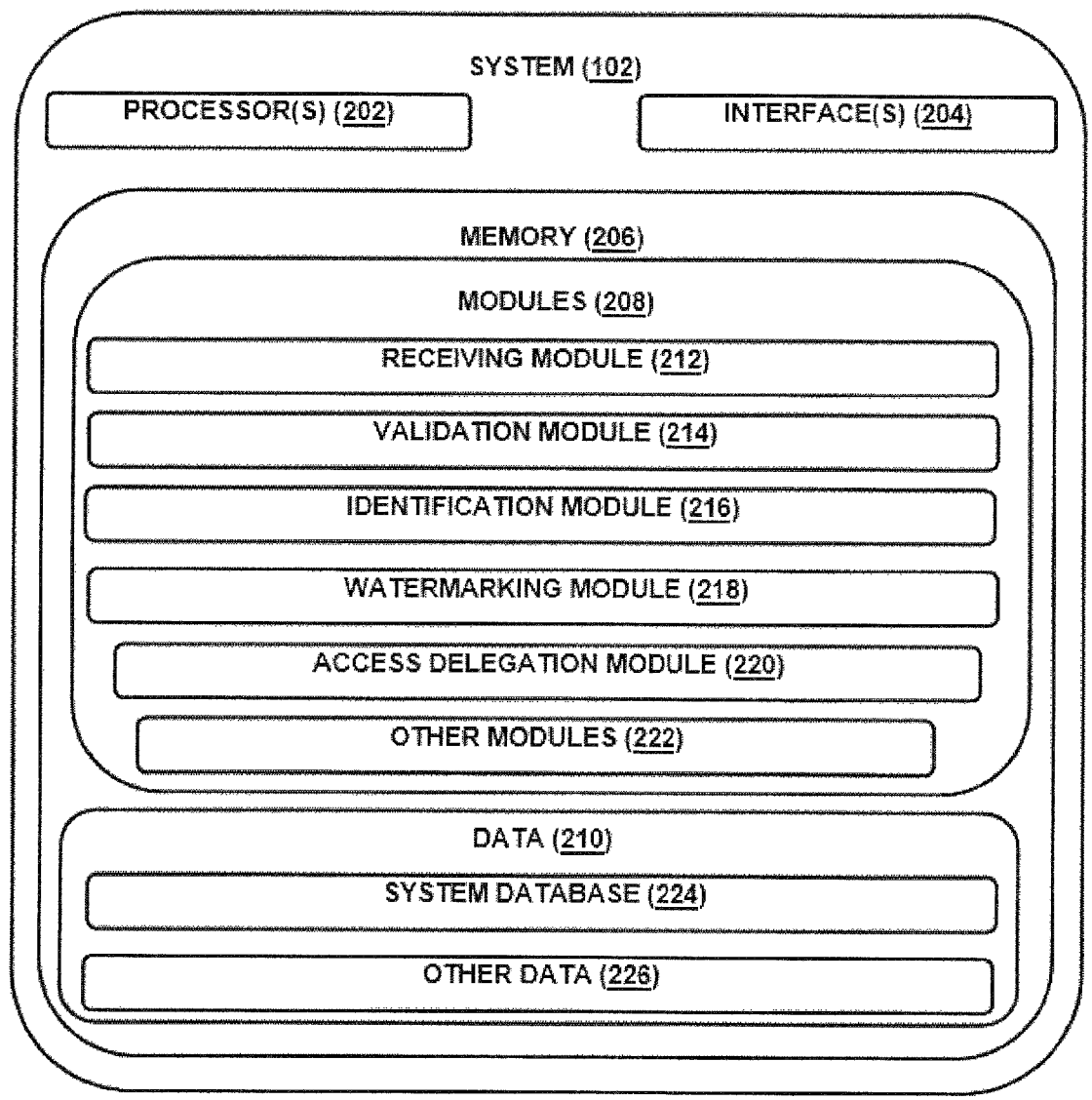
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, a validation module 214, an identification module 216, a watermarking module 218, an access delegation module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for delegating access of sensitive information by a user device to a requestor device through a central server. In order to delegating access of sensitive information by the user device to the requestor device through the central server, at first, a user may use the client device 104 to access the system 102 via the I/O interface 204. The user may register them using the I/O interface 204 in order to use the system 102. In one aspect, the user may access the I/O interface 204 of the system 102. The system 102 may employ the receiving module 212, the validation module 214, the identification module 216, the watermarking module 218, and the access delegation module 220. The detail functioning of the modules is described below with the help of figures.

The present system 102 delegates access of sensitive information of a user by a user device to a requestor device through a central server. It is to be noted that the sensitive information of the user is pre-stored at the central server. Thus, to access the sensitive information at the requestor device, initially, the requestor device may send a request to the user device in order to access the sensitive information of the user. The request may comprise a requestor's identity and a requestor's device id. Upon receipt of the request, the user device may generate a token Identification (ID) based on based on a user's identity, the requestor' identity and the requestor's device id. It is to be noted that the user device generates the token ID in an offline mode. In one example, the token ID may be at least one of an alphanumeric figure, numeric figure, alphabetic figure, and binary figure. In one exemplary embodiment, the token ID may comprise size of at least one of 8 bit, 16 bit, 32 bit, 64 bit, 128 bit, and 256 bit.

Once the token ID is generated, the user device may share the token ID with the requestor device by using at least one of a QR code, an email, a Bluetooth and other. Further, the user device also transmits the token ID to the central server. It is to be noted that the token ID transmitted to the central server is indicated as a first token ID and the token ID shared with the requestor device is indicated as a second token ID.

Upon receiving the second token ID, the requestor device may transmit the second token ID to the central server to access the sensitive information. It is to be noted that the second token ID is transmitted post entering of the second token ID in the requestor device. Upon transmitting the second token ID and the first token ID, the receiving module 212 receives the first token ID from the user device and a request to access the sensitive information of the user from the requestor device. It is to be noted that the request comprises the second token ID.

Further to receiving the first token ID and the second token ID, the validation module 214 validates the request by comparing the first token ID and the second token ID. In one example, the first token ID and second token ID may be cryptographically signed by using private keys of the user device and the requestor device respectively. Thus, in order to validate the first token ID and the second token ID, the central server may decode the first token ID and the second token ID by using public keys of the user device and the requestor device respectively. In another example, the validation module 214 module may implement a cryptographic hash technique to validate the request.

Upon validation of the first token ID and the second token ID, the identification module 216 may identify a subset of the sensitive information based on a profile of the requestor. The profile comprises demographic information, employer history, history of access to sensitive information with respective to other users, profession, location, time and others. In one example, the identification module 216 may identify the subset of the sensitive information based on a context of the delegation. In one embodiment, the context of the delegation may be determined based on the profile of the user and the requestor.

In order to elucidate further consider an example where the user is a patient and the requestor is a doctor. In this example, the subset of sensitive information may be at least one of a medical record, pathological lab reports, and health insurance. In similar fashion, if the requestor is an identity verification officer, the subset of sensitive information may include, but not limited to, a driving license, a voter id, an electricity bill, a security access card, and a passport. Thus, the identification module 216 may identify the subset of the sensitive information based on the context of the delegation and the profile of the requestor.

Subsequent to identifying the subset of the sensitive information, the watermarking module 218 watermarks the subset of the sensitive information with a set of variables to generate watermarked sensitive information. The set of variables comprise at least one of a time stamp, a session id, and Global Positioning System (GPS) coordinates of the requestor device. In one embodiment, the watermarking module 218 may track any unauthorized access of the watermarked sensitive information. It is to be noted that the watermarking is a digital watermarking facilitated by embedding the set of variables in the subset of the sensitive information. In one embodiment, the watermarking module 218 may convert the watermarked sensitive information into an image or a media file. In another embodiment, the watermarking module 218 may mask the subset of the sensitive information based on the at least one of the profile of the requestor or the context of the delegation. It is to be noted that the masking may prevent unauthorized viewing of the sensitive information by an unknown party.

Once the watermarked sensitive information is generated, the access delegation module 220 delegates the access of the watermarked sensitive information to the requestor device. In one embodiment, the access delegation module 220 may trigger a timer upon delegation of the access to the requestor device. Upon receiving the access, the watermarked sensitive information may be viewed on the requestor device. It is to be noted that the requestor device is configured to only view the watermarked sensitive information and not to download the watermarked sensitive information. Further, the access of the watermarked sensitive information is limited to a stipulated time interval provided by the central server. Thus, the watermarked sensitive information may be erased from the requestor device upon expiry of the stipulated time interval. In an exemplary embodiment, the access delegation module 220 may notify the user device about grant of the access to the requestor device.

In one example, a third party may request the requestor for the access of the sensitive information of the user. In such scenario, the requestor may receive a request along with third party's identity and a third party's device id. Upon receiving, the requestor may generate a new token ID based on the third party's identity, the third party's device id and the requestor's identity. It is to be noted that the second token ID may be encapsulated in the new token ID. Further, once the new token ID is validated from the central server, the third party may access the sensitive information of the user through the requestor device. It is important to note that the stipulated time interval to access the sensitive information is triggered when the access was delegated to the requestor device. Thus, the stipulated time interval at the third party's device is always less than the stipulated time interval at the requestor device. It is to be noted that the watermarked sensitive information shared with the requestor device may or may not be same with the sensitive information shared with the third party's device.

Figure 3:
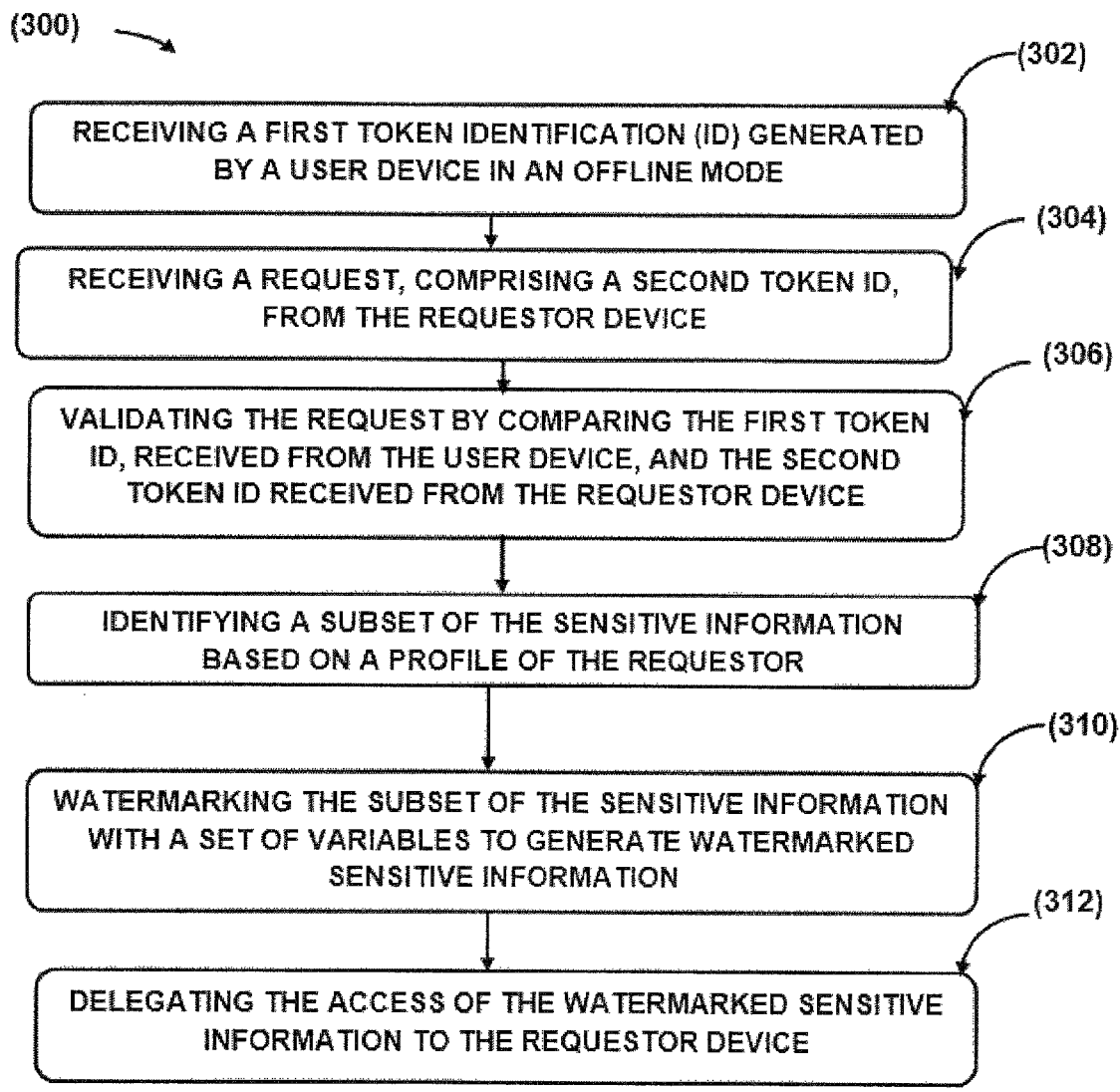
FIG. 3 illustrates a method for delegating access of sensitive information by a user device to a requestor device through a central server, in accordance with an embodiment of the present subject matter.

Referring now to FIG. 3, a method 300 for delegating access of sensitive information by a user device to a requestor device through a central server is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the system 102.

At block 302, a first token Identification (ID) generated by a user device in an offline mode may be received. In one aspect, the first token ID is generated to delegate an access of sensitive information of a user to a requestor device. In another aspect, the sensitive information of the user is pre-stored in a system database 224. In one implementation, the first token (ID) generated by a user device in an offline mode may be received by a receiving module 212.

At block 304, a request, comprising a second token ID, from the requestor device may be received. In one implementation, the request may be received by the receiving module 212.

At block 306, the request may be validated by comparing the first token ID, received from the user device, and the second token ID received from the requestor device. In one implementation, the request may be validated by the validation module 214.

At block 308, a subset of the sensitive information may be identified based on a profile of the requestor. In one aspect, the subset of the sensitive information may be identified when the first token ID is matched with the second token ID. In one implementation, subset of the sensitive information may be identified by the identification module 216.

At block 310, the subset of the sensitive information may be watermarked with a set of variables to generate watermarked sensitive information. In one implementation, the subset of the sensitive information may be watermarked by a watermarking module 218.

At block 312, the access of the watermarked sensitive information may be delegated to the requestor device. In one implementation, the access of the watermarked sensitive information may be delegated by the access delegation module 220.

Exemplary embodiments discussed above may provide certain advantages. Though not required to practice aspects of the disclosure, these advantages may include those provided by the following features.

Some embodiments enable a system and a method to delegate an access of sensitive information to one or more parties for a stipulated time.

Some embodiments enable a system and a method to securely access personal information through a device.

Some embodiments enable a system and a method to securely store sensitive information at a centralized repository.

Some embodiments enable a system and a method to watermark the sensitive information based on a profile of the requestor and context of the delegation.

Some embodiments enable a system and a method to mask the sensitive information based on profile of the requestor and context of the delegation.

Some embodiments enable a system and a method to provide secure means of sharing sensitive information.

Although implementations for methods and systems for delegating access of sensitive information by a user device to a requestor device through a central server have been described in language specific to structural features and/or methods, it is to be understood that the appended claims are not necessarily limited to the specific features or methods described. Rather, the specific features and methods are disclosed as examples of implementations for delegating access of sensitive information by the user device to the requestor device through the central server.

The invention claimed is:

1. A method for delegating access of sensitive information by a user device to a requestor device through a central server, the method comprising:
   receiving, by a processor of the central server:
      a first token Identification (ID) generated by the user device in an offline mode, wherein the first token ID is generated to delegate an access of the sensitive information of a user to the requestor device, and wherein the sensitive information of the user is pre-stored at the central server; and
      a request, comprising a second token ID, from the requestor device;
   validating, by the processor, the request by comparing the first token ID received from the user device and the second token ID received from the requestor device;
   identifying, by the processor, a subset of the sensitive information based on a profile of the requestor, when the first token ID is matched with the second token ID, wherein the profile comprises demographic information, employer history, history of access to sensitive information with respective to other users, profession, location, time;
   watermarking, by the processor, the subset of the sensitive information with a set of variables to generate watermarked sensitive information; and
   delegating, by the processor, the access of the watermarked sensitive information to the requestor device.

2. The method of claim 1, wherein the set of variables comprises at least one of: a time stamp, a session ID, or Global Positioning System (GPS) coordinates of the requestor device.

3. The method of claim 1, wherein the user device is configured to generate the first token ID and the second token ID by:
   receiving the request to delegate the access of sensitive information from the requestor device, wherein the request comprises a requestor's identity and a requestor's device ID; and
   generating the first token ID and the second token ID, in the offline mode, based on a user's identity, the requestor's identity and the requestor's device ID.

4. The method of claim 1, wherein the requestor device is configured to transmit the request to the central server by:
   sending the request for accessing the sensitive information of the user to the user device, wherein the request comprises a requestor's identity and a requestor's device ID;
   receiving the second token ID to access the sensitive information of the user, wherein the second token ID is generated by the user device in an offline mode; and
   transmitting the second token ID to a central server for accessing the sensitive information.

5. The method of claim 1, wherein the subset of the sensitive information is based on a context of the delegation.

6. A system for delegating access of sensitive information by a user device to a requestor device through a central server, the system comprising:
   a processor; and a memory coupled to the processor, wherein the processor is configured to execute a plurality of modules stored in the memory, the plurality of modules comprising:
  a receiving module for receiving:
    a first token Identification (ID) generated by the user device in an offline mode, wherein the first token ID is generated to delegate an access of the sensitive information of a user to the requestor device, and wherein the sensitive information of the user is pre-stored at the central server, and
    a request, comprising a second token ID, from the requestor device;
  a validation module for validating the request by comparing the first token ID, received from the user device, and the second token ID received from the requestor device;
  an identification module for identifying a subset of the sensitive information based on a profile of the requestor, when the first token ID is matched with the second token ID, wherein the profile comprises demographic information, employer history, history of access to sensitive information with respective to other users, profession, location, time;
  a watermarking module for watermarking the subset of the sensitive information with a set of variables to generate watermarked sensitive information; and
  an access delegation module for delegating the access of the watermarked sensitive information to the requestor device.

7. The system of claim 6, wherein the set of variables comprises at least one of: a time stamp, a session ID, and Global Positioning System (GPS) coordinates of the requestor device.

8. The system of claim 6, wherein the user device is configured to generate the first token ID and the second token ID by:
  receiving the request to delegate the access of sensitive information from the requestor device, wherein the request comprises a requestor's identity and a requestor's device ID; and
  generating the first token ID and the second token ID, in the offline mode, based on a user's identity, the requestor's identity and the requestor's device ID.

9. The system of claim 6, wherein the requestor device is configured to transmit the request to the central server by:
  sending the request for accessing the sensitive information of the user to the user device, wherein the request comprises a requestor's identity and a requestor's device ID;
  receiving the second token ID to access the sensitive information of the user, wherein the second token ID is generated by the user device in an offline mode; and
  transmitting the second token ID to a central server for accessing the sensitive information.

10. The system of claim 6, wherein the subset of the sensitive information is based on a context of the delegation.

11. A non-transitory computer readable medium embodying a program executable in a computing device for delegating access of sensitive information by a user device to a requestor device through a central server, the program comprising a program code for:
  receiving:
    a first token Identification (ID) generated by the user device in an offline mode, wherein the first token ID is generated to delegate an access of the sensitive information of a user to the requestor device, and wherein the sensitive information of the user is pre-stored at the central server, and
    a request, comprising a second token ID, from the requestor device;
  validating the request by comparing the first token ID received from the user device and the second token ID received from the requestor device;
  identifying a subset of the sensitive information based on a profile of the requestor, when the first token ID is matched with the second token ID, wherein the profile comprises demographic information, employer history, history of access to sensitive information with respective to other users, profession, location, time;
  watermarking the subset of the sensitive information with a set of variables to generate watermarked sensitive information; and
  delegating the access of the watermarked sensitive information to the requestor device.

* * * * *